United States Patent
Kaneko et al.

[11] Patent Number: 5,337,600
[45] Date of Patent: Aug. 16, 1994

[54] FLAT BELT TYPE DRIVE CHASSIS DYNAMOMETER WITH COMPACT CONSTRUCTION

[75] Inventors: Kimihiko Kaneko, Tokyo; Masami Takahashi; Akira Nakajima, both of Kanagawa, all of Japan

[73] Assignee: Kabushiki Kaisha Meidensha, Japan

[21] Appl. No.: 44,075

[22] Filed: Apr. 6, 1993

Related U.S. Application Data

[63] Continuation of Ser. No. 648,850, Jan. 31, 1991, abandoned.

[30] Foreign Application Priority Data

Feb. 6, 1990 [JP] Japan .................. 2-10924[U]

[51] Int. Cl.$^5$ .............................................. G01L 3/02
[52] U.S. Cl. .............................................. 73/117
[58] Field of Search ................... 73/117, 123–127, 73/862.17, 862.391, 862.392, 862.55

[56] References Cited

U.S. PATENT DOCUMENTS

| | | | |
|---|---|---|---|
| 28,743 | 6/1860 | Duff et al. | 73/862.392 |
| 2,744,409 | 5/1956 | Wintle, Jr. et al. | 73/862.17 |
| 3,520,180 | 7/1970 | Polhelmus | 73/71.7 |
| 3,886,788 | 6/1975 | Jeter, Jr. | 73/117 |
| 4,077,255 | 3/1978 | Murakami | 73/117 |
| 4,901,560 | 2/1990 | Hirano et al. | 73/117 |
| 4,928,538 | 5/1990 | Burdess et al. | 73/862.41 |
| 4,953,391 | 9/1990 | Schober et al. | 73/117 |
| 5,000,038 | 3/1991 | Katt | 73/117 |
| 5,063,773 | 11/1991 | Fujimori et al. | 73/117 |

FOREIGN PATENT DOCUMENTS

| | | |
|---|---|---|
| 3040355 | 10/1980 | Fed. Rep. of Germany . |
| 2310556 | 12/1976 | France . |
| 0001573 | 1/1980 | Japan .................. 73/862.17 |

*Primary Examiner*—Robert Raevis
*Attorney, Agent, or Firm*—Ronald P. Kananen

[57] ABSTRACT

A flat belt type chassis dynamometer includes a pair of rotary drum wound around an endless steel belt. A dynamometer is built into one of the rotary drums. The dynamometer has a rotor oriented outside and adjacent the inner periphery of the rotary drum.

4 Claims, 2 Drawing Sheets

FLAT BELT TYPE DRIVE CHASSIS DYNAMOMETER WITH COMPACT CONSTRUCTION

This application is a continuation of a application Ser. No. 07/648,850 filed Jan. 31, 1991, now abandoned.

BACKGROUND OF THE INVENTION

1. Field of the invention

The present invention relates generally to a flat belt type chassis dynamometer for bench testing an automotive vehicle. More specifically, the invention relates to a flat belt type chassis dynamometer of compact construction to be conveniently installed in a test plant.

2. Description of the Background Art

In the automotive industries, bench testing apparatus has been used for testing performance of the vehicle. For instance, the bench test is typically performed for each completed vehicle in the automotive manufacturing plant. In one of the typical constructions of bench testing apparatus a pair of rotary drum are provided to be rotatingly driven by the engine driving torque transmitted thereto via vehicular driving wheels. The rotary drums are associated with a dummy load, such as a flywheel, for duplicating vehicular traveling resistance, and a dynamometer for measuring driving torque exerted on the rotary drum. Also, U.S. Pat. No. 3,520,180 to V. D. Polhemus et al. discloses a road simulator for vehicle suspension system evaluation including, for each suspended wheel, a simulator unit comprising a pair of drums mounted on a spring suspended frame and linked by a flat belt. A roller pad defining a flat wheel support surface contacts to the frame. A hydraulic actuator is directly connected to the roller pad to permit vertical displacement inputs of varying frequency to be applied to the pad.

The prior proposed belt type bench testing apparatus additionally employs an external dynamometer which is connected to an intermediate coupling. External connection of the dynamometer may necessarily cause increasing of the bulk size of the testing apparatus. The bulky testing apparatus requires a wider space for installation in a test plant.

SUMMARY OF THE INVENTION

Therefore, it is an object of the present invention to provide a bench testing apparatus which is constructed compact enough to conveniently facilitate installation in a testing plant.

Another object of the invention is to provide a flat belt type chassis dynamometer which does not require additional space for the dynamometer.

In order to accomplish the aforementioned and other objects, a flat belt type chassis dynamometer includes a pair of rotary drums wound around an endless steel belt. A dynamometer is built into one of the rotary drums. The dynamometer has a rotor oriented outside adjacent the inner periphery of the rotary drum.

According to aspect of the invention, a flat belt type chassis dynamometer comprises;

a first and second drums arranged in a spaced apart relationship to each other;

an endless belt wound over the first and second drums for forming a surface on which a vehicular wheel is mounted; and a dynamometer disposed within the first drum to be driven with the first drum.

According to another aspect of the invention, a flat belt type chassis dynamometer comprises;

a first drum rotatable about a first axis, the first drum being formed in a hollow construction for defining therein a hollow space;

a second drum arranged in a spaced apart relationship from the first drum and rotatable about a second axis arranged in a parallel relationship with the first axis;

an endless belt wound over the first and second drums for forming a surface on which a vehicular wheel is mounted; and a dynamometer disposed within the internal space of the first drum so as to be driven with the first drum for commonly rotating about the first axis.

The dynamometer may comprise a rotor secured on the first drum for rotation therewith and a stator arranged radially inside of the rotor. The second drum may be associated with a tension adjusting means for shifting the second drum toward and away from the first drum in order to adjust tension on the belt. The tension adjusting means comprises a sliding bearing permitting shifting of the second drum and an actuator for driving the second drum for shifting.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
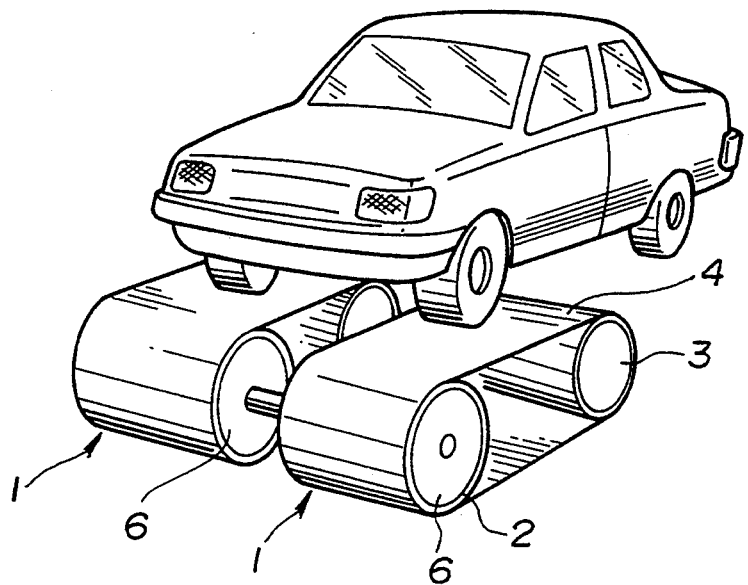
FIG. 1 is a perspective illustration of the preferred embodiment of a flat belt type chassis dynamometer according to the present invention.
Figure 2:
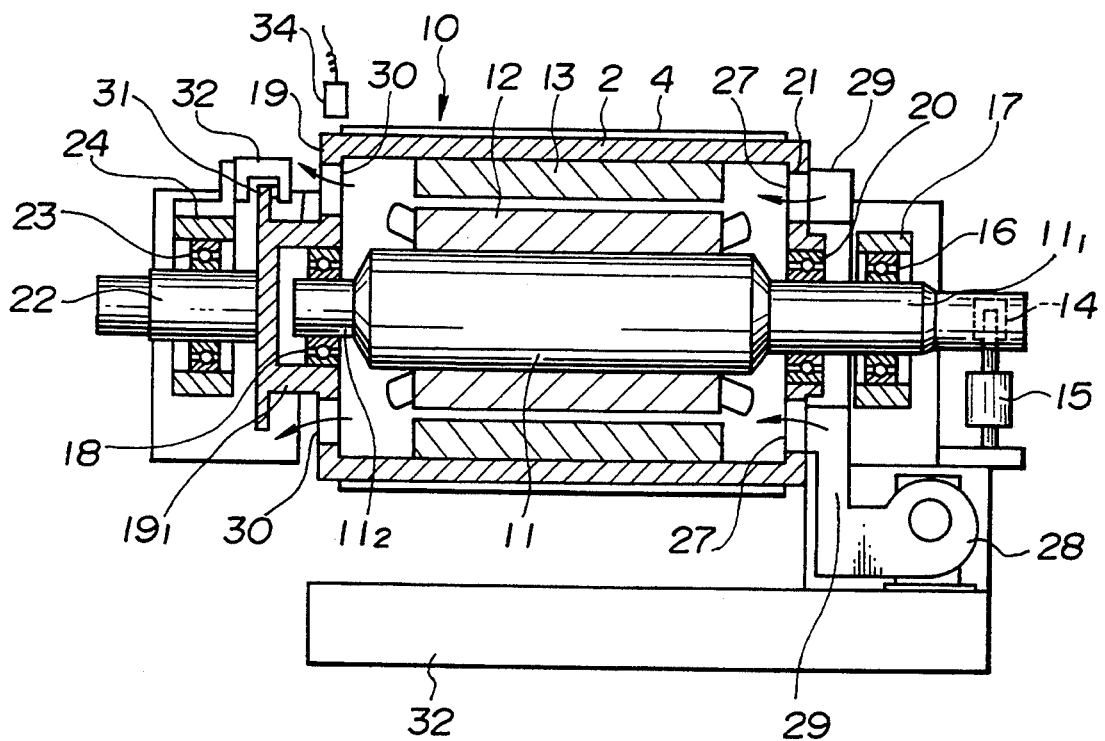
FIG. 2 is a section of a rotary drum in which is built into a dynamometer.

Referring now to the drawings, particularly to FIG. 1, the preferred embodiment of a flat belt type chassis dynamometer, according to the present invention, is illustrated in a condition of practical use. As can be seen, in the shown example, a pair of flat belt assembles 1 are provided for respectively supporting one of the vehicular driving wheels. Each flat belt assembly 1 comprises a front drum 2 and a rear drum and an endless steel belt 4 wound over the front and rear drums 2 and 3. In the shown embodiment, a roller dynamometer 10 is built-in the front drum 1. The roller dynamometer 10 includes an alternating current dynamometer 6. A support plate is disposed between the front and rear rollers 2 and 3. The support plate 33 has a support surface oriented immediately beneath the steel belt 4. Between and opposing the supporting surface of the support plate 33 and the lower surface of the belt 4, a hydrodynamic bearing layer is formed for assuring smooth movement of the belt. Formation of a hydrodynamic bearing between the belt and the support has been disclosed in U.S. Pat. No. 4,324,128 to Langer, issued on Apr. 12, 1982, and. U.S. Pat. 4,622,848 to Doi, issued on Nov. 18, 1986. The disclosure of the above-identified U.S. Patents are herein incorporated by reference for the sake of disclosure.

The roller dynamometer 10 has a stator core 12 rigidly attached onto a starer shaft 11. A rotor core 13 is mounted on the inner periphery of the hollow rotary drum body 2. A torque arm 14 is connected to one axial end $11_1$ of the stator shaft 11. The torque arm 14 is, in turn, connected to a load cell 15.

As can be seen, the axial end $11_1$ of the stator shaft 11 is rotatably supported on a supporting member 17 via a bearing 16. The other hand of the starer shaft 11 is rotatably supported by a cylindrical projection $19_1$ which extends axially from the radially extending end plate 19, via a bearing 18.

The front drum 2 has a radial plate 21 or oriented at one axial end remote from the radial plate 19. The front drum 2 is supported on the stator shaft 11 via a bearing 20. On the other hand, a connection shaft 22 extends axially from the axial end of the cylindrical projection $19_1$. The connection shaft 22 is rotatably supported on a support plate 24 via a bearing 23. The connection shafts 22 of the flat belt assemblies 1 are oriented in opposition to each other and coupled by means for coupling (not shown) for synchronous revolution. Furthermore, a clutch can be disposed between the opposing ends of the connection shafts 22 for selectively connecting and disconnecting each other. By disconnecting the shafts 22, the belts 4 are driven independently of each other so as to provide a phase difference between the vehicular wheels.

The radial plate 21 is formed with a plurality of air induction openings 27. On the other hand, the radial plate 19 is formed with a plurality of ventilation opening 30. The air induction openings 27 are connected to a blower unit 28. The blower unit 28 feeds pressurized air to the air induction openings 27 to generate the air flow across the dynamometer 6. Therefore, the dynamometer 6 can be satisfactorily cooled by the cooling air flow.

In order to adjust tension of the steel belt 4, a tension adjusting mechanism is provided for the rear drum 3. The tension adjusting mechanism comprises a sliding bearing 35 which rotatably support-the drum shaft of the rear drum 3 and permits the drum shaft to shift toward and away from the front drum 2. In order to shift the drum shaft, a hydraulic cylinder 88 is provided. An edge sensor 34 is provided in the vicinity of the belt path for detecting meandering of the belt for adjusting the position of the rear drum 3 relative to the front drum 2 for adjusting the tension on the belt and thereby suppressing unacceptable meandering.

On the other hand, a hydraulic disc brake 32 is provided. The hydraulic disc brake 32 is associated with an axial end plate 31 of the cylindrical protection 19. The disk brake 32 is applied for locking the belt. Locking of the belt becomes necessary when the vehicle is moved into and out of the testing apparatus.

Figure 3:
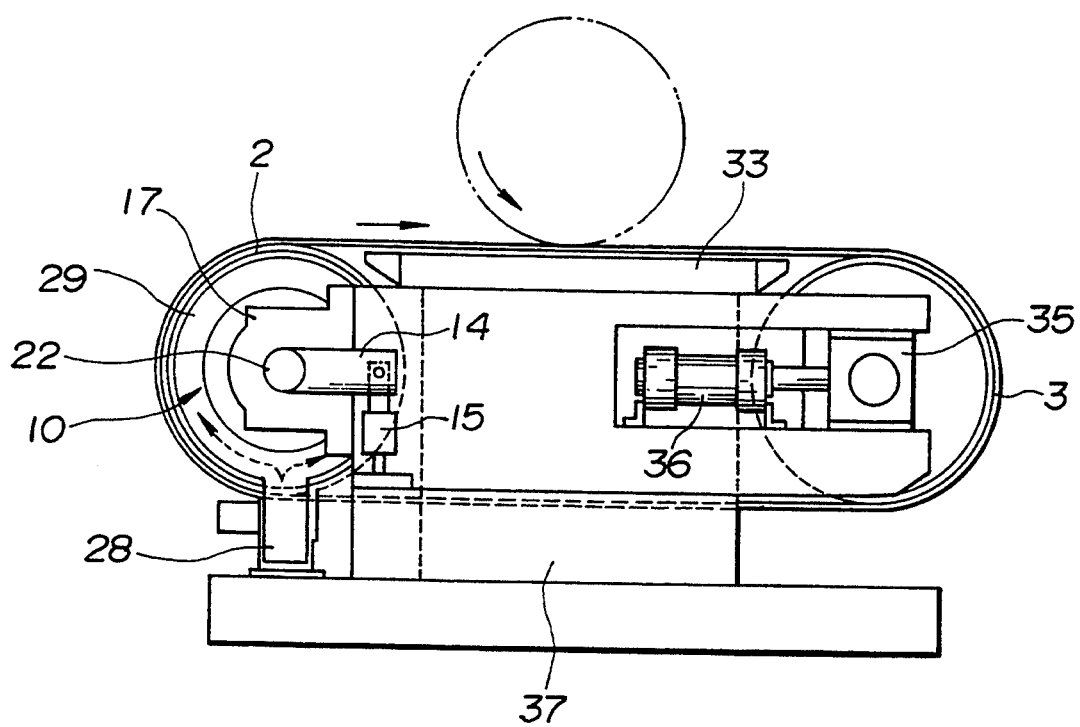
FIG. 3 is a side elevation of the preferred embodiment of the flat belt type chassis dynamometer according to the invention.

In FIG. 3, the reference numeral 37 denotes a frame supporting the flat belt assembly 1.

In the shown construction, the bench test is performed by placing the driving wheels of the vehicle on the belt 4. By driving the vehicular wheels by the engine output torque, the belt 4 is driven to rotatingly drive the rotary drum 2. The rotor core 13 is secured on the inner periphery of the rotary drum 2 to rotate therewith. By rotation of the rotor core 13, the electric power is generated to absorb the driving torque. Reaction force is then transferred to the load cell 15 via the torque arm to measure the driving torque applied to the belt via the vehicular wheel. On the other hand, it is also possible to drive the belt to drive the vehicular wheel.

While be present invention has been discussed in terms of the preferred embodiment of the invention, the invention can be embodied in various forms. Therefore, the invention should be understood to include all possible embodiments and modification which can be implemented without departing from the principle of the invention.

What is claimed is:

1. An apparatus for testing performance of an automotive vehicle, comprising:
   front positioned and rear positioned hollow rollers arranged in a spaced apart relationship to each other for the vehicle to match with a mutual dimension of the rollers;
   at least one endless belt wound over said front positioned and rear positioned rollers for forming a surface on which at least one vehicular tire wheel is mounted; and
   a dynamometer disposed within an inner space of at least one roller, wherein said dynamometer includes a rotor core attached around a wall of the roller so that power derived from the vehicular tire wheel is transmitted to the roller and rotor core, said dynamometer further including a stator core attached around a stator axle of the dynamometer, said stator axle being arranged radially inside of the rotor; a torque arm extended from the stator axle which receives a reaction from the stator core; and a load cell for measuring the reaction via the torque arm, both said rotor core and said stator core carrying out electrical generation when receiving the power of the vehicular tire wheel, wherein said roller is associated with a tension adjusting means for shifting said one roller toward or away from the other roller in order to adjust tension on the belt, said tension adjusting means comprising an edge sensor located above an edge of said roller so constructed as to detect a behavior of the belt on an outer periphery of the roller, a sliding bearing permitting shifting of said one roller and an actuator for driving said one roller for shifting.

2. An apparatus for testing performance of an automotive vehicle, comprising:
   a first hollow roller rotatable about a first axis, said first hollow roller being formed with a hollow construction for defining therein a hollow space;
   a second hollow roller arranged in a spaced relationship with said first hollow roller, and rotatable about a second axis which is arranged in parallel with said first axis;
   at least one endless belt wound over said first and second hollow rollers for providing a surface on which at least one vehicular tire wheel is mounted;
   a dynamometer disposed within the hollow space of said first hollow roller so as to be driven with said first hollow roller and so as to be commonly rotatable about said first axis, wherein said dynamometer comprises a rotor secured to said first hollow roller for rotation therewith and a stator arranged radially within the rotor, wherein said second hollow roller is associated with a tension adjusting means for shifting said second hollow roller toward and away from said first hollow roller in order to adjust tension in the belt, wherein said tension adjusting means comprises a sliding bearing permitting shifting of said second hollow roller, and an actuator for driving said second hollow roller for shifting, and wherein a disc is provided on an outer periphery of a projection which extends from a side of said first roller, said disc cooperating with a hydraulic disc brake which is disposed immediately adjacent said disc.

3. An automotive testing apparatus comprising:

first hollow roller which is rotatable about a first axis;

a second hollow roller which is rotatable about a second axis which is parallel to said first axis, said second roller being disposed in a spaced relationship with respect to said first roller;

an endless belt which is supported on said first and second rollers, said endless belt having a surface for supporting a vehicular wheel;

a dynamometer disposed within said first roller and operatively connected with said first hollow roller so as to be driven thereby, said dynamometer including:

a rotor which is secured to said first roller so as to be synchronously rotatable therewith, and a stator which is disposed radially inside said rotor;

tension adjusting means associated with said second roller for displacing said second roller with respect to said first roller in a manner which changes the distance between said first and second rollers and varies the tension in said belt, said tension adjusting means including:

a slidable bearing which rotatably supports said second roller, and an actuator which is operatively connected with said slidable bearing; and brake means for preventing said first roller from rotating under predetermined conditions, said brake means including a disc which is rigid with said first roller and synchronously rotatable therewith.

4. An automotive testing apparatus as set forth in claim 3, wherein the disc of said brake means extends from a coaxial cylindrical projection which is formed on one side of said first roller, and wherein said cylindrical projection receives a bearing which supports an end of the stator of said dynamometer.

* * * * *